United States Patent [19]
Dobson

[11] 3,714,694
[45] Feb. 6, 1973

[54] PROCESS OF MAKING A COMPOSITE BEARING RACE OR THE LIKE
[75] Inventor: John C. Dobson, Bay Village, Ohio
[73] Assignee: Formmet Corporation, Avon, Ohio
[22] Filed: June 9, 1971
[21] Appl. No.: 151,264

[52] U.S. Cl............29/148.4 R, 29/159.2, 29/527.5, 29/527.6, 29/DIG. 6, 29/DIG. 18
[51] Int. Cl............................B21h 1/12, B23p 25/00
[58] Field of Search.29/148.4 R:159.2, 527.5, 527.6, 29/DIG. 6, DIG. 18

[56] References Cited
UNITED STATES PATENTS 1,831,310   11/1931   Lindemuth.....................29/DIG. 6
2,106,590   1/1938    Boegehold et al..............29/527.6

Primary Examiner—Thomas H. Eager
Attorney—Bosworth, Sessions, Herrstrom & Cain

[57] ABSTRACT

Disclosed are antifriction bearings, annular ring blanks for forming races of the bearings, and a process of making the annular blanks. The process involves centrifugally casting metals having different chemical compositions, such as steel having different amounts of carbon or other alloying elements, to form a tubular casting having at one periphery metal that has a different chemical or metallurgical composition and hardenability than the metal at the other periphery; annular rings are cut from this tubular casting, and these rings are hot worked by working including roll forging, under conditions that beneficially modify the structure of the metal. The resulting race may be machined into annular bearing races by the usual procedures to form bearing races. These races are hardened in a known manner and by known means, to provide hard metal where the rolling antifriction elements, such as balls, contact the metal, while the metal at the opposite side of the race is substantially more ductile and tough, so that it may be machined to provide gear teeth, or may be machined or welded for other purposes as to provide fastening means for the bearing race.

14 Claims, 15 Drawing Figures

PATENTED FEB 6 1973

INVENTOR.
JOHN C. DOBSON
BY Bosworth, Sessions,
Herrstrom & Cain
ATTORNEYS

INVENTOR.
JOHN C. DOBSON
BY
Bosworth, Sessions,
Herrstrom & Cain
ATTORNEYS

INVENTOR.
JOHN C. DOBSON
BY
Bosworth, Sessions,
Herrstrom & Cain
ATTORNEYS

3,714,694

PROCESS OF MAKING A COMPOSITE BEARING RACE OR THE LIKE

FIELD OF THE INVENTION

This invention relates to processes and products of processes for making unitary annular members of integral metal having different characteristics at the inner and outer peripheries of the annular members. The members may be annular blanks for antifriction bearing races or the races themselves, in which at one periphery of the member the metal is hardenable, or has been hardened, to a desired high degree of hardness and at portions away from such periphery the metal has substantially less hardness and greater ductility and toughness.

While the invention may be used for various purposes, it provides exceptional advantages when used in bearing races for large diameter antifriction bearings for rotatably supporting laterally swingable parts of power cranes or shovels such as those including the boom of the crane or shovel; and when used in processes for making annular blanks out of which such bearing races are made and for making races from such blanks. Therefore the invention will be discussed in connection with such uses.

Races for such bearings must include metal that is capable of being substantially hardened and hence rendered quite brittle at and for some distance below surfaces of the grooves or raceways against which bear the balls or other antifriction elements of the bearings to minimize wear. Nevertheless, such a race must also include metal away from such hard metal that is sufficiently ductile and tough and possesses sufficient tensile strength to resist the stresses, forces and shocks to which the race may be subjected in service; and often such a race must include metal sufficiently ductile, tough and strong to permit machining the periphery opposite the raceway to gear teeth that can be used to rotate the race by power means to swing the swingable parts of the crane or shovel, or to permit machining or welding of parts such as fastening means at locations away from the raceway.

Prior to the present invention these requirements could not fully and satisfactorily be met in a race, for such a large bearing, that was formed of a single integral piece of metal, because the race metal in the vicinity of the balls was either too soft or incapable of being hardened, or the metal of portions of the race in which gear teeth were to be cut or fastening means were to be machined or welded was too hard and brittle to provide fully the desired ductility, toughness and strength characteristics. If the metal portion of an antifriction bearing race to be contacted by the balls or other rotatable antifriction elements is too soft because it is not hardenable to a sufficient degree this portion of the race will deform or wear or otherwise harmfully affect the antifriction characteristics of the bearing; but if the remaining metal portions of the race are too hard, they will be so brittle and subject to cracking that they will not be sufficiently strong, tough and ductile for the service they should perform and will not be capable of being machined to form gear teeth of sufficient tensile strength and toughness or of being satisfactorily welded.

DESCRIPTION OF PRIOR ART

Where in such a large bearing race it has been heretofore necessary to provide substantial hardness at the raceway portion at which the antifriction elements bear, and substantial ductility, toughness and tensile strength elsewhere, it has usually been found necessary to form the bearing race out of two separately formed connected annular members of different metals, one member having the raceway and having desired hardening characteristics to produce hard bearing surfaces, and the other annular member being of a metal that has desired strength, toughness and ductility to withstand loads and shocks and to permit machining or welding or both. It has been necessary separately to form the annular members of different metals having the desired different characteristics, carefully machine them, fit them together and fasten them together. This is a complicated and expensive procedure and if not properly performed can result in failure of or other difficulties with the bearing. Such composite race structures also use substantially more metal and are heavier than if the race could be formed of a single piece of metal.

SUMMARY OF THE INVENTION

It is an object of the present invention to avoid as many as desired of the above problems.

It is another object to provide a process of making unitary generally annular ring members formed of integral metal having different characteristics across the cross section of the member. Such a member may be a blank used in the manufacture of bearing races to overcome the above indicated problems.

Another object is the provision of processes of making such annular members, and processes of making bearing races from such members.

According to the invention, a unitary annular ring member of metal of varying composition to permit the metal of the member to be substantially harder and less ductile near one periphery of the member than is the metal near the opposite periphery of the member, is made by a process which comprises forming the member by centrifugally casting a metal of a first preselected composition; then before appreciable solidification of said first metal, centrifugally casting inside of said first metal a metal of another preselected composition, said centrifugal casting being accomplished so that after solidification the metals form a unitary annular, such as a tubular metal cast body of integral metal of different compositions across the thickness of the solidified body; forming a unitary annular, preferably ringlike, member of said integral metal from the tubular cast metal body; heating the annular member to a temperature sufficient to permit it to be hot-worked; and hot-working the member while at hot-working temperature by subjecting it to generally radial compressive forces on opposite peripheral sides of the member throughout the circumference of the member until the grain structure thereof is such that after the member has been cooled and the portion at a peripheral edge is thereafter subjected to heat-hardening treatment the metal of the heat-hardened portion has substantially greater hardness than the metal of the remainder of the member and the remainder of said member is substantially more ductile, tough and strong than the heat-hardened portion.

The annular member preferably is hot-worked by roll forging, by subjecting it to compressive generally radial forces on opposite peripheral sides thereof as the member is rotated relative to the location of application of the radial forces, to cause such forces to be applied entirely around the circumference of the member.

If desired, the annular member while at hot working temperature may also be subjected to hot-working by substantially compressing it generally transversely of the annular member, either before or after the application of radial forces.

When the annular member is to be used for a bearing race, it may be machined to the desired dimensions and also to form in a known manner a raceway or antifriction element groove on the periphery of the race that has the desired hardening characteristics, while if desired, on the other periphery of the race having the desired ductility and toughness of metal gear teeth may be cut or fastening or other means may be machined or welded. Thereafter, the race may be subjected to the usual hardening treatment to harden the raceway, and may be incorporated in an antifriction bearing in a known manner.

An antifriction bearing embodying the invention may have one or both races produced in this manner, each race being formed of integral metal of varying composition across the cross section of the race to provide desired hardness at the periphery containing the raceway against which bears the antifriction elements such as balls, and desired toughness, ductility and tensile strength in other parts of the race for serviceability, machinability, or weldability.

A race embodying the invention is easier to make than prior composite races, since there are no separate parts that must be separately made, fitted and mechanically secured together. Such a race may also be lighter and stronger than conventional large races, while providing harder surfaces when welded, and therefore be better suited for use in large antifriction bearings than prior races.

BRIEF DESCRIPTION OF DRAWINGS

These and other objects and features of the invention will be apparent from the following discussion of preferred embodiments in connection with the following drawings in which.

DESCRIPTION OF PREFERRED EMBODIMENTS

Figure 1:
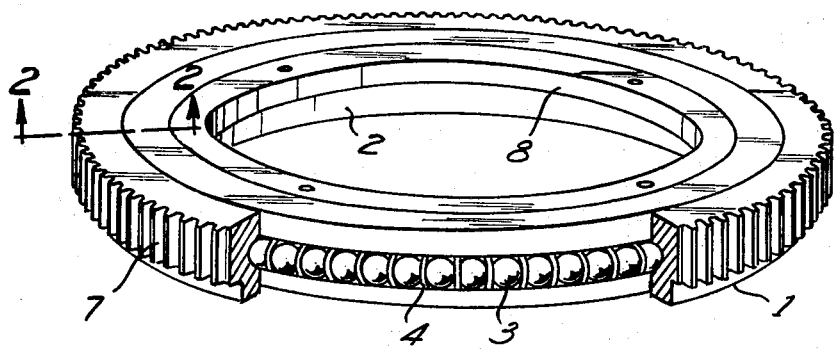
FIG. 1 shows a large antifriction bearing of the ball bearing type, suitable for use in power cranes or shovels, embodying the invention.
Figure 2:
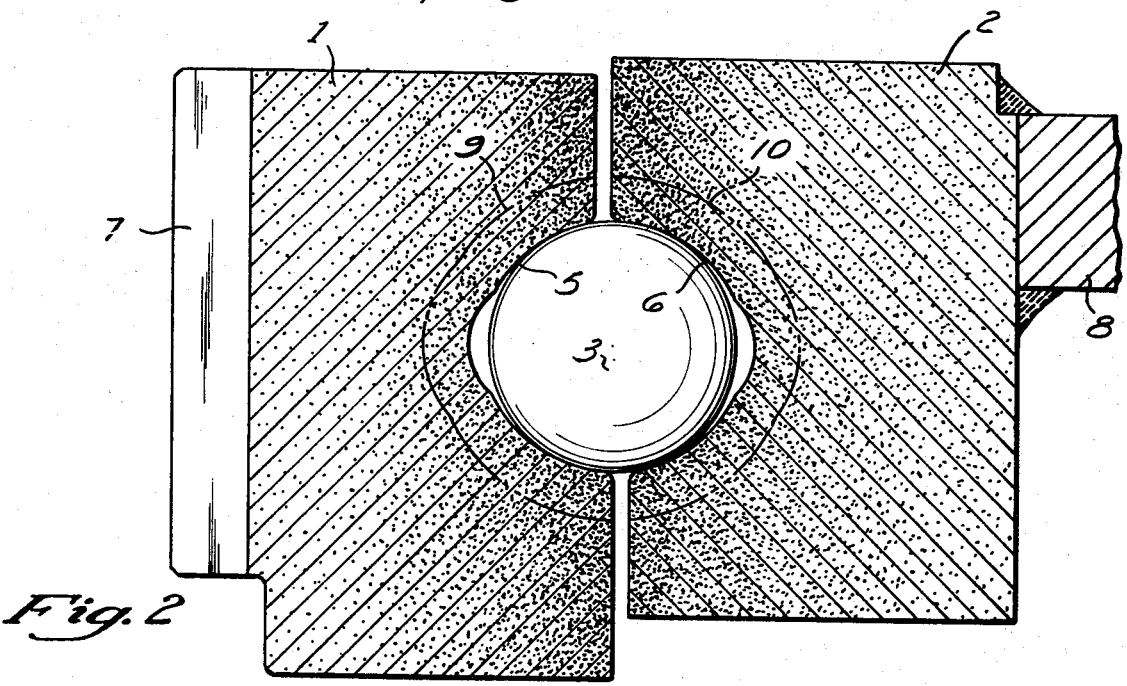
FIG. 2 is a cross section along line 2—2 of FIG. 1 and to a larger scale, showing outer and inner bearing races embodying the invention.

As shown in FIGS. 1 and 2, an antifriction bearing embodying the invention comprises an outer race 1, an inner race 2, balls 3 constituting rolling antifriction elements, and ball retainer means 4 of conventional type. Outer race 1 has a raceway or ball groove 5 of known shape, and the inner race 2 has a raceway or ball groove 6 of known shape.

The outer race 1 is a unitary annular member of integral metal and also has on its outer periphery gear teeth 7 machined into the race. The inner race also is a unitary annular member of integral metal and has attachment bracket 8 welded to its inner periphery.

The integral metal forming the outer race has carbon contents that are substantially higher near the periphery having the raceway than the carbon contents near the other periphery having gear teeth 7. The higher carbon contents at the inner periphery of the outer race are indicated by the closer spacing of the dots in the cross section illustrated by FIG. 2.

The metal adjacent groove 5 has been hardened by known means such as induction heating for a substantial depth into the metal, as approximately indicated by the broken lines 9; such metal is considerably harder than the metal in the rest of the race. This hardened metal provides the desired hard surface of groove 5 that resists wear from the balls. The substantial thickness of such considerably harder metal and the hardness and toughness of the metal adjacent such hardened metal, are sufficient to prevent spalling of the metal at the surface of groove 5 under load or impacts of the balls 5. The metal of the race away from the inner periphery and near the outer periphery is substantially tougher and more ductile, and of substantially higher tensile strength, preferably having such toughness and ductility near the outer periphery of the race in which the gear teeth are cut.

The inner race is similar, except that in this case, as shown by the spacing of the dots in the cross section, the annular body of integral metal of the inner race has a substantially higher carbon content in the metal near the outer periphery containing the raceway 6 than the metal near the inner periphery to which the bracket 8 is welded. In this race also the metal in the vicinity of the race groove 6, to a depth approximately indicated by broken lines 10, is considerably harder than the remainder of the metal in the race, this hardness having been achieved by a known localized hardening operation as by induction heating; the thickness of the hardened metal and the characteristics of the metal adjacent the hardened metal are such as to prevent spalling of the raceway metal. The metal away from the outer periphery containing the raceway 6 and nearer the inner periphery is substantially softer, more ductile, and of greater tensile strength; it is readily weldable, as to permit welding of bracket 8 or to permit welding of the inner race at its inner periphery directly to the vehicle.

Figure 3:
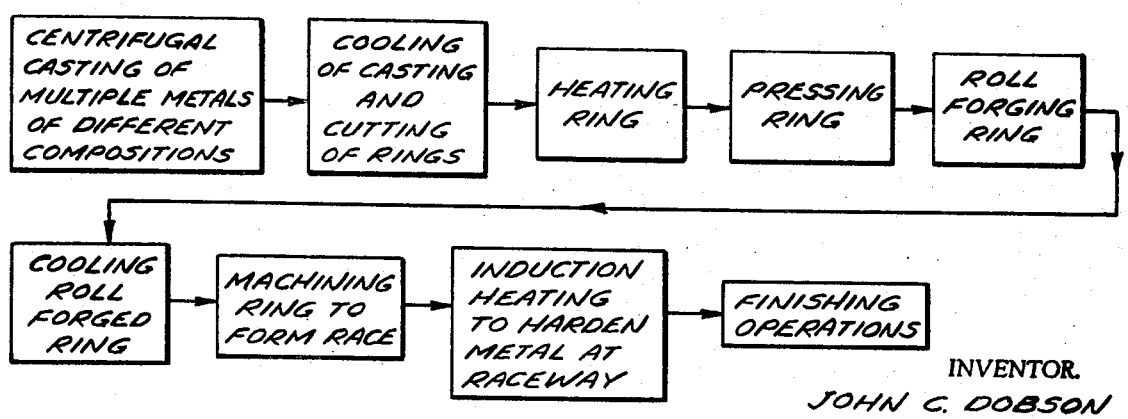
FIG. 3 is a diagrammatic representation of a process embodying the invention that may be used to make bearing races embodying the invention.

A preferred illustration process for manufacturing races of the above type is illustrated by FIG. 3. For convenience the process will be first discussed below in connection with the outer race, differences in making the inner race being discussed thereafter.

Figure 4:
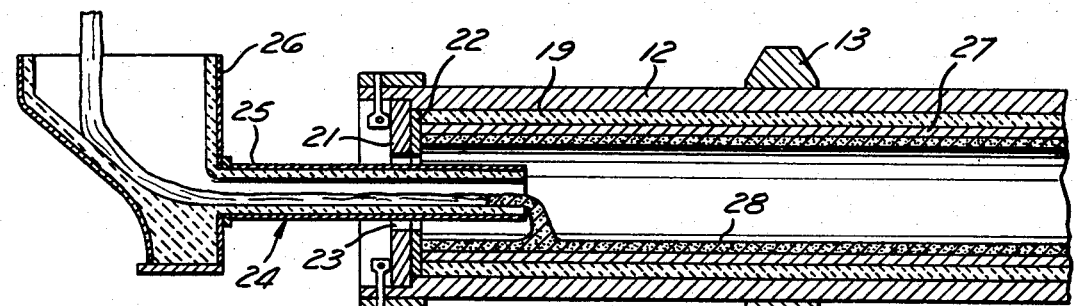
FIG. 4 is a cross section showing the centrifugal casting of a tubular member of metal of compositions that are different at the inner and outer peripheries of the member.
Figure 4:
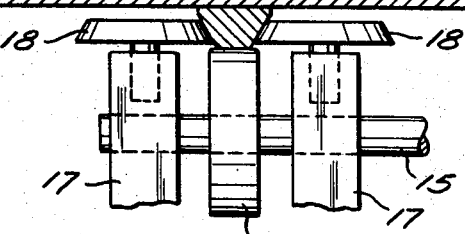

In making the outer race, the first step (FIG. 3) of centrifugal casting of multiple metals of different compositions is illustrated in FIG. 4.

The apparatus diagrammatically shown in FIG. 4 is known, comprising a cylindrical hollow metal mold 12 having annular supporting rings 13, of which one is shown, each riding on a roller 14 fixed to a drive shaft 15 journaled in frame members 17 and rotated by suitable power means not shown. The mold is located against axial movement by guide rolls 18 rotatably supported on frame members 17 and bearing against the sides of ring 13. Before the casting operation, the mold in known manner is provided with an inner lining 19 of rammed sand and a demountably attached end plate 21 lined with heat resistant material 22 and having an opening 23. A pouring spout 24 has an axially extending pouring portion 25 extending into the mold and an upwardly opening receiving portion 26 outside of the mold, the pouring spout in a known manner being lined with refractory material. The interior surface of lining 19 is preferably washed with known materials to reduce porosity of the sand.

As the mold is rotated in conventional manner, molten metal, such as steel of a relatively low carbon content predetermined to provide after solidification and hot working the desired ductility, toughness and tensile strength of the metal at the outer periphery of the race, is poured into the receiving portion 26 and discharged from portion 25 of spout 24 into rotating mold 12. There the hot metal in known manner under the influence of centrifugal force spreads along and is held against the interior periphery of the sand lining 19 in a layer 27 of substantially uniform desired thickness by introduction of a predetermined amount of the molten metal. Before substantial solidification can occur and before all gases exuded from the molten metal escape from the space inside the mold and permit air to enter to oxidize the surface of the poured metal in the mold, another molten metal of a different chemical composition, such as steel of a predetermined higher carbon content to provide after solidification and hot working steel of desired substantial hardenability at the peripheral portion of the race having the raceway, is introduced into the pouring spout and caused to flow into the mold and form under the influence of centrifugal force, a layer 28 of metal of higher carbon content inside layer 27. The desired thickness of layer 28 is also predetermined by the amount of metal introduced.

Since in this case the lower carbon steel that was first cast has a higher specific gravity than the higher carbon steel that was last cast, there is little tendency for substantial migration of the two types of molten steel into each other. Therefore, the last cast higher carbon steel may be poured into the mold immediately after completion of the pouring of the lower carbon steel layer. In general, the time between completion of casting of the metal of higher specific gravity and beginning of casting of metal of the lower specific gravity may range from zero to 5 minutes and preferably is as short a time as feasible. Moreover, the two casting operations themselves should be carried out as rapidly as feasible is accordance with known practices.

By proper control of the conditions, the lower carbon steel first cast and the higher carbon steel next cast will merge to form a unitary annular body of integral metal in the solidified casting, which metal will have a desired substantially higher carbon content at the inner peripheral portion of the casting and a desired lower carbon content at the outer peripheral portion of the casting.

The speed of rotation of the mold is based on known conventional practice; in general the mold is rotated to cause a force of about 75g's (75 times gravity) at the center of the wall thickness of the cast metal, and not less than about 55g's at the inner surface of the casting. Forces of such magnitude densify the metal and cause removal of gases from the interior of the metal, to permit formation of a sound, dense casting free of voids or occlusions. The mold is rotated for about an hour to allow the metal to solidify, after which the mold is removed to a cooling area until the tubular casting 30 in the mold is solid and can be removed from the mold in known manner.

Figure 5:
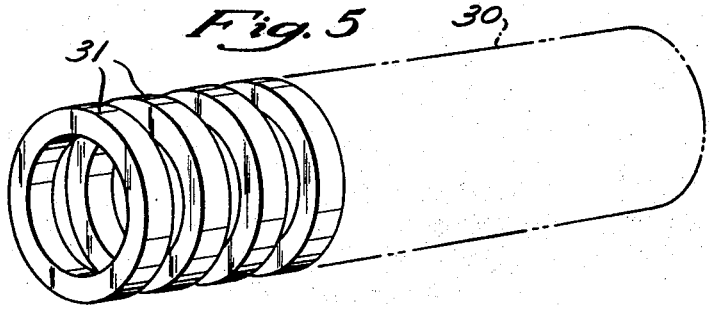
FIG. 5 is a perspective of the cast tubular member showing several annular ring members cut from the tubular cast member.
Figure 6:
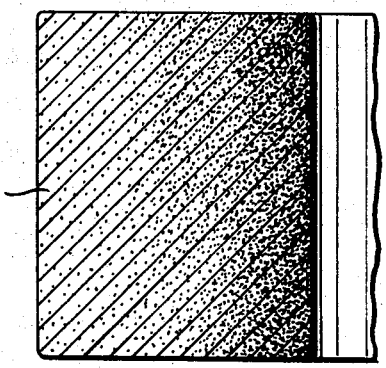
FIG. 6 diagrammatically illustrates a cross section to a larger scale than FIG. 5, through one of the ring members after it has been cut from the tubular member.

Thereafter (FIG. 3), casting 30 is cut into annular ring members or rings 31 (FIG. 5) for subsequent working. An illustrative cross section of one of the rings, which is a blank from which the race is made, is shown in FIG. 6. The varying carbon content across the ring between its inner and outer periphery is indicated by different spacing of the dots in cross section, the closer spaced dots near the inner periphery of the ring indicating a higher carbon content than the wider spaced dots near the outer periphery of the ring.

Figure 7:
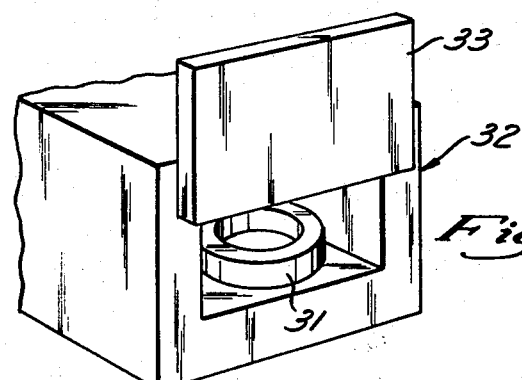
FIG. 7 is a diagrammatic view illustrating a step of heating in a furnace a ring member to desired hot-working temperatures for subsequent hot working of the ring member.

Next, (FIG. 3) the ring is heated to hot-working or forging temperature. This is illustrated by FIG. 7 showing a conventional heating furnace 32 with a ring 31 in the furnace, the door 33 of the furnace being raised to show the ring. The furnace may be gas fired or otherwise heated. The ring is heated to the desired temperature for time long enough to cause substantially uniform heating throughout the cross section of the ring. In general, the hot working temperatures are between about 1800° F and about 2400° F., preferably 1900° F. to 2250° F., for steels of the carbon contents that would be used in the manufacture of bearing races.

Figure 8:
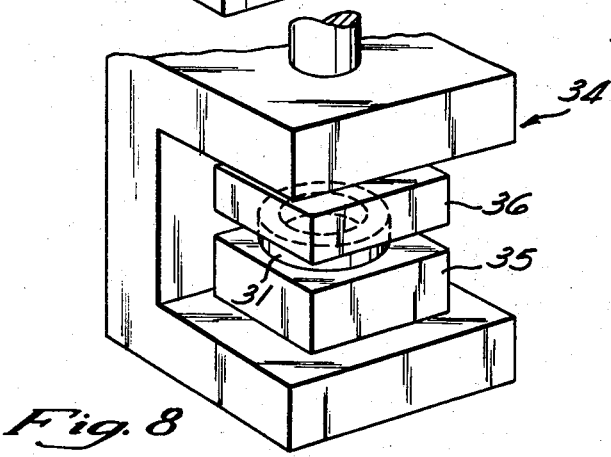
FIG. 8 diagrammatically illustrates a step of hot-working the heated ring member by pressing it transversely and axially thereof in a heavy duty press.
Figure 9:
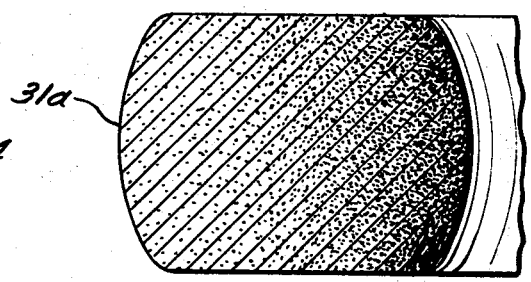
FIG. 9 generally illustrates a typical cross section of the ring member after the pressing operation, the scale being generally the same as that of FIG. 6.

Thereafter, the ring is removed from the furnace and placed in a conventional hydraulic press 34 diagrammatically shown in FIG. 8, having a fixed platen 35 and a movable platen 36 between which the ring is hot worked by pressing on its faces (FIG. 3). During this operation the ring is flattened, so its width is substantially reduced, as to about 65 to 85 percent and preferably about 75 percent of its original width. The inner and outer diameters of the ring are increased, and the grain sizes of the cast metal are reduced for substantial distances inwardly from the faces of the ring. The cross section of the ring, now identified as 31a for convenience, then resembles that shown in FIG. 9, the carbon contents of the metal being substantially higher near the inner periphery of the ring than the outer periphery.

Figure 10:
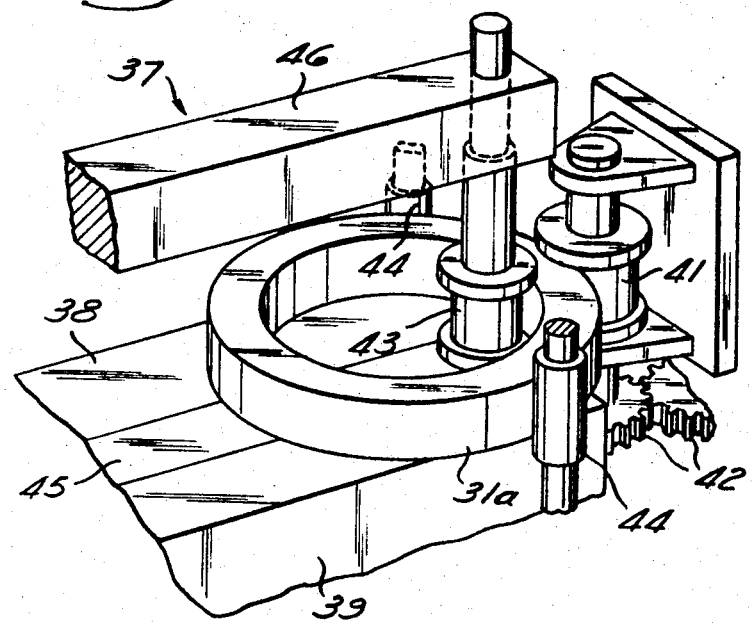
FIG. 10 diagrammatically illustrates a step of hot-working the ring member by roll forging to subject it to radial hot working forces entirely around its circumference.

The ring is then further hot worked, as by roll forging by forces applied radially to its inner and outer peripheral surfaces (FIG. 3) transverse to the pressure direction of the previous hot working. Usually, no further heating is required, but if necessary the ring can be reheated. Apparatus 37 of the type indicated in FIG. 10 may advantageously be used for the roll forging hot working. In this apparatus, the ring 31a is supported on the upper surface 38 of a base 39 and is rotated while it is pressed radially between a drive roll 41 that is positively driven by suitable drive means such as gears 42, and a freely rotatable pressure roll 43 that is pressed on the ring 31a toward the drive roll 41, the ring 31a being further guided by side rolls 44. Roll 43 is rotatably supported by upper and lower longitudinally movable members 45 and 46 that can be moved by suitable means, not shown, to cause roll 43 to press the ring 31 against the drive roll 41 with forces on the inner and outer peripheral sides of the ring sufficient to cause the desired hot working. In the apparatus illustrated, members 45 and 46 can be moved to retract the roll 43 from its pressing position, and member 46 can also be raised to lift the roll 43 from member 45 to permit a ring 31a to be inserted into and removed from the apparatus. Side rolls 44 are also movable toward and away from ring 31a to permit the ring to be put into and removed from the machine.

This hot working by roll forging around the entire circumferences of the ring substantially decreases the cross sectional thickness of the ring between its inner and outer peripheries, and substantially enlarges the diameters of the inner and outer ring peripheries. The ring thickness is reduced to about 50 to 75 percent of the thickness before roll forging and preferably about 65 percent. The amount of roll-forging to which the ring is subjected is predetermined to accomplish the desired dimensional changes. The roll forging causes substantial reductions in the grain sizes of the ring metal for substantial distances inwardly from the inner and outer peripheries of the ring, preferably throughout the entire cross section of the ring entirely around its circumference. The substantial roll forging hot working also causes substantial orientation of the grain structure parallel to the circumferential surfaces of the ring to increase toughness and strength of the metal in the circumferential direction.

This radial hot working, as well as the prior hot working transverse or axial hot working, closes voids that might have existed in the cast metal and welds them shut, provides a more homogeneous physical structure of the metal, toughens the metal, and increases its tensile strength.

The ring is then allowed to cool in ambient air, preferably while resting on a sand bed or other bed that does not chill it.

Figure 11:
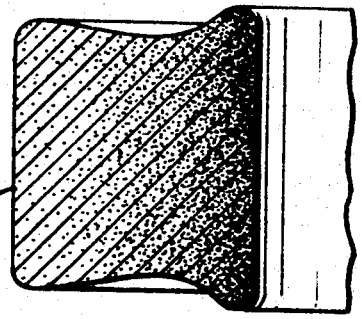
FIG. 11 generally illustrates a typical cross section of the ring member after it has been roll forged, making possible the use of the ring member as a blank out of which an antifriction bearing race may be made.

The cross section of the ring now referred to by character 31b then may be of the general shape and proportions indicated at FIG. 11.

Figure 12:
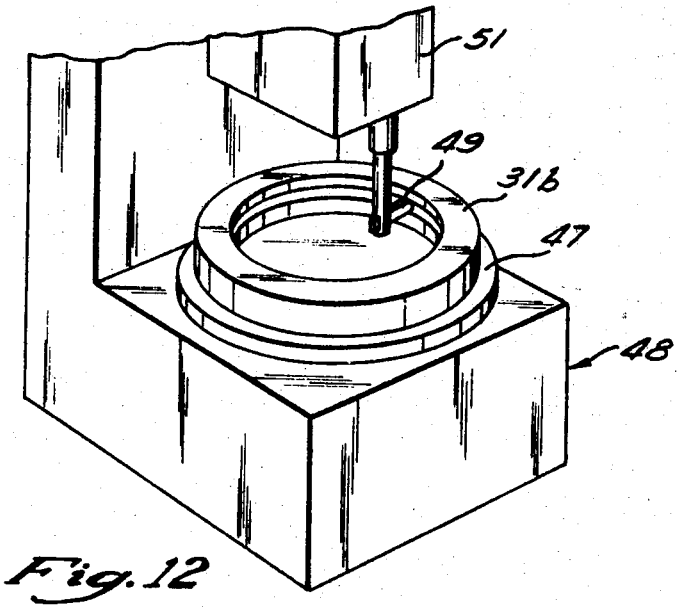
FIG. 12 diagrammatically illustrates an operation of machining the roll forged ring member to make an antifriction bearing race from it.

After cooling, the ring 31b is then machined (FIG. 3) by conventional means and methods to the desired dimensions and shape, as is diagrammatically indicated in FIG. 12, which shows the ring fixed on the rotary work table 47 of a conventional machine tool 48 and having a raceway being cut in its inner periphery by a suitable tool 49 mounted on the movable head 51 as the ring rotates about a vertical axis.

The shape of the raceway is designed in conventional manner and is machined in conventional manner. The remaining portions of the race are machined to desired shapes and dimensions by conventional means and methods; and if gear teeth 7 are desired on the outer periphery, they are also machined.

After suitable machining, the race is subjected to hardening conditions that locally harden the metal in the vicinity of the race groove. This may be done by conventional means and methods, as by induction heating (FIG. 3).

Figure 13:
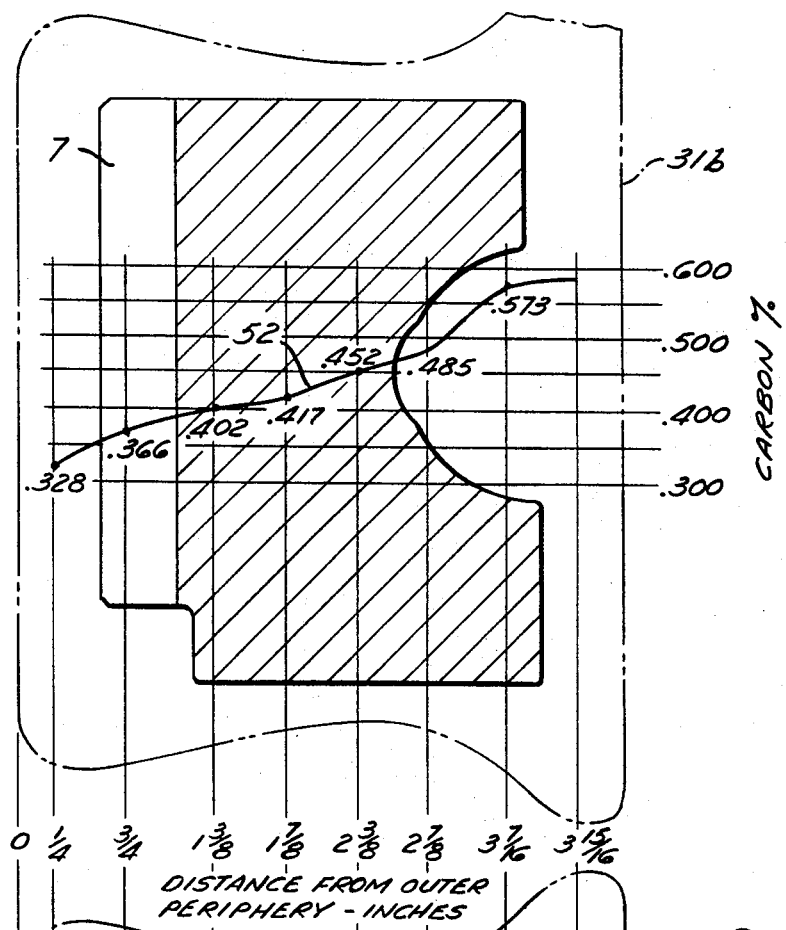
FIG. 13, to the scale of FIG. 2, illustrates in broken lines the cross section before machining of a roll forged ring member that is a blank for an outer bearing race, and in full lines the outer race after machining, the figure having superposed thereon a graph with a line indicating the varying carbon contents from the inner to the outer peripheries of the ring member.

The completed outer race 1 is shown in cross section in full lines in FIG. 13. Broken lines 31b show the cross section of a ring constituting the forged ring blank after the hot working and cooling but before it would be machined to form the race.

As an example, race 1 of FIGS. 1 and 13 may be produced by first centrifugally casting molten SAE No. 1040 steel as describe above, to provide substantially half the desired thickness of the tubular casting that is desired, and then casting inside of the layer of first cast metal SAE No. 1050 steel to provide the other half of the desired casting thickness. The resulting tubular casting on cooling has an external diameter of essentially 20-½ inches and a wall thickness of essentially 4-¾ inches. The tubular casting is then cut into rings 31 approximately 6 inches wide. A ring is then heated to a temperature of approximately 2250° F. for a time sufficient to cause it to be substantially uniformly heated throughout its cross section and then subjected Successful castings for use in making the inner races of large antifriction bearings are possible by first casting SAE No. 1050 steel at the outer periphery and then next casting SAE No. 1040 steel at the inner periphery according to the above procedure. Tests of carbon at intervals across the thickness of the ring between its inner and outer peripheries show that the carbon contents and hence hardenability of the metal near the outer periphery of the ring is substantially greater than the carbon content of the metal near the inner periphery of the blank.

Even greater differences in carbon contents in castings for inner races are also possible by first centrifugally casting' SAE No. 1070 steel, followed after a short time by centrifugally casting the SAE No. 1020 steel. Although some migration occurs between the steel of different carbon contents and specific gravities, tests of carbon contents of a ring cut from the tubular casting show that on an inner race ring the higher carbon contents near the outer periphery of the ring having the higher carbon content and the lower carbon contents near the inner periphery of the ring were comparable to the higher and lower carbon contents in an outer race casting made by first casting SAE No. 1040 steel and followed by casting SAE No. 1050 steel.

Various modifications can be made in the processes and products described above.

Figure 15:
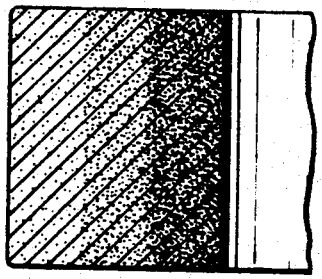
FIG. 15 diagrammatically illustrates to a smaller scale than FIGS. 13 and 14 a cross section before hot working of an annular ring member resulting from centrifugal casting of more than two metals.

For example, in a bearing race blank ring where exceptionally high hardenability is required at one periphery of the blank, as may be provided by high carbon contents or other alloying ingredients, and substantially lower hardenability is required at the other periphery of the blank, and the two metals of different composition that it is desired to use will not readily fuse, it is possible to make castings of integral sound metal out of which the rings can be cut by first centrifugally casting the first metal, then casting a second metal that acts as a merging metal and is compatible with the two metals that are to be near the inner and outer peripheries of the casting, and then casting the third metal having characteristics or composition substantially different from the first cast metal. The resulting cross section of such a ring cut from such a casting is illustrated in FIG. 15. Rings of more than three centrifugally cast metals may also be made and used.

Moreover, the compressive or upsetting hot working may be carried out after, rather than before, the roll forging as described above, or both before and after the roll forging hot working. Moreover, it is possible under certain circumstances to omit completely the upsetting hot working, although in general it is beneficial in providing hot working transverse to the hot working provided by the roll forging.

Furthermore, a ring of larger width can be cast and hot worked by roll forging and, then after cooling, be cut into more than one ring blank out of each portion a bearing race may be provided.

Furthermore, depending on characteristics desired, the races after machining and hardening of the raceways, may be given no further treatment, or may be given additional heat treatment over part or all of the metal away from the raceways. For example, the gear teeth cut into a race may be case hardened by known methods and means. As another example, all the metal away from the raceways may be moderately hardened by known means and methods as to a Brinnell Hardness Number of about 270 to about 300, as to impart moderate hardness to gear teeth, or a combination of such moderate hardening and case hardening of gear teeth can be used.

Furthermore, while ball antifriction bearings and their races are discussed above, it is apparent that the invention is applicable to roller or other types of antifriction bearings and their races.

While most of the above disclosures involve the use of steel of different carbon contents, it is apparent that steels of alloying ingredients other than those discussed above may be used and cast and worked according to the present invention, and that blanks produced according to the present invention may be used for purposes other than races of the antifriction bearings illustrated.

It is apparent that modifications other than those discussed above may be made in the processes and products of the present invention without departing from the spirit of the invention. It is intended that the patent shall cover, by suitable expression in the appended claims, whatever features of patentable novelty reside in the invention.

I claim:

1. A process of making a unitary annular member of integral metal of varying composition across the member to permit the metal of the member to be substantially harder and less ductile near one periphery of the annular member than is the metal near the opposite periphery of the annular member, which process comprises centrifugally casting a metal of a first composition in a hollow zone of generally circular cross section that is rotated about an axis passing through the center of the cross section, and then before appreciable solidification of the first metal centrifugally casting inside of said first metal a metal of another composition, the centrifugal casting being carried out so that said metals form after solidification a unitary annular cast body of integral metal of a varying composition across the cross section of the solidified body between its inner and outer peripheries; and hot working an annular member formed of said body at hot working temperature by subjecting said annular member to a substantial generally radial compressive force on opposite peripheral sides thereof around its entire circumference until the grain structure thereof is such that after the annular member has been cooled and the portion at a peripheral side thereof is subjected to heat-hardening treatment so that the hardened portion has substantial greater hardness than the remainder of said annular member and the remainder of said annular member is substantially more ductile and tough than said hardened portion.

2. The process of claim 1 in which said annular member is hot-worked by subjecting it to compressive general radial forces on opposite peripheral sides thereof as the annular member is rotated relative to the location of application of said forces to cause said forces to be applied entirely around the circumference of the ring, the forces being sufficient to cause a substantial reduction in the thickness of the annular member.

3. The process of claim 1 in which said annular member while at hot-working temperature is subjected to an upsetting operation in a suitable known press that reduces its width to about 4-½ inches and its thickness between its inner and outer peripheries to about 6 inches, with a corresponding increase in the outer diameter of the ring.

The ring is then subjected to a roll forging operation as described above, without reheating, until the thickness of the ring between its internal and external peripheries is approximately 4-¼ inches and the width of the ring between its top and bottom is approximately 4-¾ inches for the major portion of the thickness of the ring.

The ring is then machined to form a race having an internal diameter of 28-½ inches and an external diameter to the outer edges of the teeth of 36-¾ inches, and a thickness between the upper and lower faces of 4-⅛ inches and a raceway of proper shape and size on its inner periphery. The metal at the raceway is then locally hardened, as to a Rockwell "C" hardness of approximately 58 to 60 at the raceway surface and about 48 to 52 at about ¼ inch into the surface; the hardening treatment may be carried out by known means and processes, such as induction hardening, normally used to harden SAE No. 1050 steel.

In FIG. 13, the varying carbon content of the hot worked ring, the cross section of which is shown in broken lines, from which the race was machined, is indicated by line 52. This line represents the percentage of carbon at locations across the cross section of the ring between its outer and inner peripheries. The information was obtained by diametrically cutting the ring and taking carbon contents at the distances from the outer periphery indicated at the bottom of FIG. 13, across the thickness of cross section of the ring between its outer and inner peripheries. It will be noted from line 52 that the carbon content and hence the hardenability of the metal is considerably higher at the inner side of the ring 31b in which the raceway 5 is to be cut, to provide desired hard metal in the location where it is needed most. In the remaining part of the cross section, the carbon content is lower, and the ductility, toughness, tensile strength, and resistance to shocks of the metal are substantially higher, high enough indeed to permit the machining of the gear teeth 7 and the provision of strong, tough, gear teeth that will withstand shocks and forces arising in use and free of brittleness that could cause the metal to crack in service.

Figure 14:
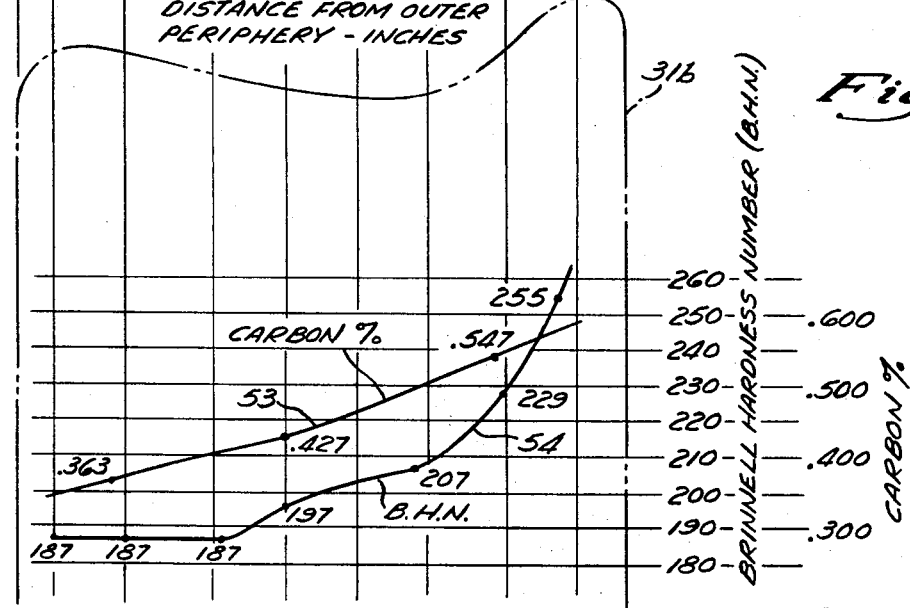
FIG. 14, to the scale of FIG. 13, shows the cross section before machining of a roll forged ring member from which an outer bearing race may be machined, having superposed on the cross section curves indicating the carbon contents and Brinnell Hardness Numbers of the metal after the metal body has been subjected to heat treatment for hardening, to illustrate a relationship between carbon content and hardenability.

FIG. 14 illustrates the relationship between carbon content and hardness across a cross section of a ring made generally as indicated above by first centrifugally casting SAE No. 1040 steel and then centrifugally casting SAE No. 1050 steel, to form a tubular cast structure from which was cut into a ring that was hot worked, including roll forged, as described above. In this case, carbon contents were determined as indicated above at three locations across the thickness of the ring at the distances indicated from the outer to the inner periphery, each of these carbon contents being the average of three determinations spaced along the width of the ring at the indicated distance; line 53 is plotted from these points. The sample tested was heated to normalize at 1650° F. for one hour per inch of maximum cross sectional dimension and then air cooled; then heated for hardening at one hour per inch of maximum cross section dimension and air quenched; then heated for four hours at 1200° F. to temper and air cooled. This hot treatment was used to develop hardness to demonstrate the relationship between carbon contents and hardness in the test sample. Brinnell Hardness Numbers (BHN) were determined at the locations indicated across the thickness of the ring and line 54 plotted from these numbers. It can be seen from FIG. 14 that the carbon content at a distance of ⅝ inch in from the outer periphery of the ring was about 0.363 percent, and at 1-⅞ inches in from the outer periphery was about 0.427 percent, and 3-⅝ inches in from the outer periphery was 0.547 percent. Correspondingly, Brinnell Hardness Numbers ranged from 187 at ¼ inch in from the outer peripheral surface to 255 approximately ½ inch in from the inner peripheral surface with intermediate numbers of 187, 197, 207 and 229.

When it is desired to make an inner race of an antifriction bearing, in which higher carbon steel of substantially greater hardenability is near the outer periphery of the ring where the raceway will be cut and the lower carbon more ductile and tough steel is near the inner periphery of the ring, a somewhat similar procedure may be followed. The higher carbon steel is first centrifugally cast, followed by casting of the lower carbon steel inside of the first cast metal. Although there may be a tendency for the higher carbon metal, which has a lower specific gravity, to migrate toward the inner periphery of the casting, and the higher specific gravity lower carbon metal to migrate toward the outer periphery of the casting these tendencies can be eliminated or minimized. This can be done by allowing a short time, as from about 7 to about 15 minutes and preferably about 10 minutes, to elapse after the higher carbon metal is first cast before the lower carbon metal material is centrifugally cast. The short delay permits sufficient solidification of the first cast higher carbon metal to prevent substantial migration of the lower specific gravity higher carbon metal into the higher specific gravity lower carbon metal and vice versa. The short interval must not be long enough to permit oxidation of the first cast metal that could prevent complete fusing of the two metals, but should be long enough to permit sufficient solidification to inhibit harmful migration or intermixing of the separately cast metals.

If the inner race is to be mated in a bearing with an outer race of the dimensions previously given, then the tubular casting of which the inner race is ultimately formed must have a predetermined smaller outside and inside diameter. The rings cut from such a casting may be hot worked as described above by imposition of substantial radial forces as by roll forging, preferably preceded by hot working by imposition of substantial axial forces as by upsetting as previously discussed, the amounts of reductions of cross sectional dimensions preferably being along the lines of those indicated previously.

After cooling the hot worked ring is then machined by conventional means to provide a race of the desired dimensions. The raceway portion of the race is then hardened as indicated above by known methods and means, such as induction heating, to harden the metal for a desired depth in the vicinity of the raceway to provide good wear surfaces.

to hot-working by substantially compressing it generally transversely of the annular member to cause a substantial reduction in the width of said annular member.

4. The process of claim 1 in which said annular member while at hot-working temperature is subjected to hot-working by substantially compressing it generally transversely of the annular member before said annular member is subjected to hot-working by subjecting it to said radial compressive forces.

5. The process of claim 1 in which said first and second metals that are centrifugally cast are steels of different compositions, one of said compositions containing ingredients in proportions that will cause the solid metal to achieve substantial hardness on heat-hardening and the other of said metals being a steel of a composition containing ingredients in proportions such that the steel will be substantially more ductile and tough than said hardened portion.

6. A process of making a unitary annular member of integral metal of varying composition across the ring to permit the metal of the annular member to be substantially harder and less ductile near one periphery of the annular member than is the metal near the opposite periphery of the annular member, which process comprises centrifugally casting a metal from a first composition in a hollow zone of generally circular cross section that is rotated about an axis passing through the center of the cross section, and then before appreciable solidification of the first metal centrifugally casting inside of said first metal a metal of another composition, the centrifugal casting being carried out so that the metals form a unitary annular tubular cast body of integral metal of varying composition across the cross section of the solidified body between its inner and outer peripheries; forming a unitary annular member of said integral metal from said tubular cast metal body; heating said annular member to a temperature sufficient to permit it to be hot-worked; and hot working said annular member while at hot-working temperature by subjecting it to substantial generally radial compressive forces on opposite peripheral sides thereof throughout the circumference of the annular member until the grain structure thereof is such that after the annular member has been cooled and the portion at a peripheral side thereof is thereafter subjected to hardening treatment the hardened portion has a substantially greater hardness than the remainder of said annular member and the remainder of said annular member is substantially more ductile and tough than said hardened portion.

7. The process of claim 6 in which said annular member is hot-worked by subjecting it to compressive general radial forces on opposite peripheral sides thereof as the annular member is rotated relative to the location of application of said forces to cause said forces to be applied entirely around the circumference of the annular member.

8. The process of claim 6 in which said annular member while at hot-working temperature is subjected to hot-working by substantially compressing it generally transversely of the annular member.

9. The process of claim 6 in which said annular member while at hot-working temperature is subjected to hot-working by substantially compressing it generally transversely of the annular member before said annular member is subjected to hot-working by subjecting it to said radial compressive forces.

10. The process of claim 6 in which said metals that are centrifugally cast are steels of different compositions, one of said compositions containing ingredients in a proportion which will cause the solid metal to achieve substantial hardness on heat-hardening and the other of said metals being a steel of a composition containing ingredients in proportion such that the steel will be substantially more ductile and tough than said hardened portion.

11. The process of claim 6 in which three metals are centrifugally cast to form said tubular cast body, each of said metals having a different composition, and the resulting solid tubular cast body is formed of integral metal throughout its cross section from one periphery to the other.

12. The process of claim 11 in which said three metals are steels of different compositions.

13. The process of claim 1 in which said annular member is machined to form a bearing race, including a raceway on the peripheral side thereof at which the metal has maximum hardenability, and in which the portion of the metal forming the raceway is subjected to heat-hardening treatment to harden the metal forming the raceway surface.

14. The process of claim 6 in which said annular member is machined to form a bearing race, including a raceway on the peripheral side thereof at which the metal has maximum hardenability and in which the portion of the metal forming the raceway is subjected to heat-hardening treatment to harden the metal forming the raceway surface.

* * * * *